United States Patent [19]

Masuda et al.

[11] Patent Number: 4,587,886
[45] Date of Patent: May 13, 1986

[54] POWER STEERING DEVICE

[75] Inventors: Naosuke Masuda; Hirotetsu Sonoda, both of Saitama, Japan

[73] Assignee: Jidosha Kiki Co., Ltd., Tokyo, Japan

[21] Appl. No.: 595,122

[22] Filed: Mar. 30, 1984

[30] Foreign Application Priority Data

Apr. 28, 1983 [JP] Japan .................. 58-73840
Jun. 8, 1983 [JP] Japan ............. 58-86380[U]

[51] Int. Cl.$^4$ ............................................. F15B 15/17
[52] U.S. Cl. ........................................ 91/415; 91/467; 137/625.24
[58] Field of Search ............ 91/415, 416, 417, 375 R, 91/375 A, 470, 467; 137/625.24

[56] References Cited

U.S. PATENT DOCUMENTS

| 954,401 | 4/1910 | Steedmen | 91/415 |
| 4,182,219 | 1/1980 | Baatrup | 91/415 |

FOREIGN PATENT DOCUMENTS

| 138483 | 9/1901 | Fed. Rep. of Germany | 91/415 |
| 2931139 | 2/1981 | Fed. Rep. of Germany | |
| 47-24821 | 8/1972 | Japan | |
| 49-49541 | 12/1974 | Japan | |
| 54-64333 | 5/1979 | Japan | |
| 56-128270 | 10/1981 | Japan | |
| 2055718 | 3/1981 | United Kingdom | |

Primary Examiner—Paul E. Maslousky
Attorney, Agent, or Firm—Sughrue, Mion, Zinn, Macpeak, and Seas

[57] ABSTRACT

A power steering device having a fluid pressure cylinder of a single rod type providing like output characteristics for steering both rightwardly and leftwardly. A rod-side chamber and a head-side chamber of the fluid pressure cylinder have different pressure receiving areas. A control valve controls the changeover of a flow path among a pump, a tank and the rod-side and head-side chambers in accordance with the movement of a steering wheel such that the rod-side chamber is connected to the pump and the tank is connected to the head-side chamber when the piston is to be moved toward the head-side chamber, and the pump is connected to both the head-side chamber and the rod-side chamber when the piston is to be moved toward the rod-side chamber.

3 Claims, 10 Drawing Figures

POWER STEERING DEVICE

BACKGROUND OF THE INVENTION

The present invention relates to a power steering device provided with a fluid pressure cylinder of the single rod type, and more particularly to a control valve for controlling changeover of a flow path in such a device.

As a fluid pressure cylinder for generating auxiliary steering power by supplying fluid pressure, a dual rod type cylinder has been most frequently used. However, a single rod type cylinder is also known which is advantageous in view of its simplified structure as well as its cost. If such a single rod type cylinder is arranged to merely selectively supply fluid pressure to either one of the chambers of the cylinder, the movement of the cylinder on opposite sides of its neutral or outer position in the axial direction of the piston is asymmetric because the opposite side chambers of the cylinder have different fluid pressure receiving areas. Hence, the magnitude of the supplied steering power for a given amount of movement of the steering wheel is different in two opposite directions, resulting in a difficulty in steering the vehicle.

Various arrangements have been proposed to solve such an asymmetric movement of piston. As disclosed in Japanese Laid-open Patent Application No. 128270/1981, a control valve for changing the characteristic of the supply flow to the rod-side chamber and the head-side chamber is provided with which the quantity of supply to the head-side chamber is decreased in accordance with the ratio of the pressure receiving area to make the respective movements of the piston in the right and left directions substantially equal. In this device, however, the structure of the control valve is necessarily complex and costly. Also, the value can be affected by the steering speed, temperature, or the like such that the same output characteristics in the right and left directions are not always obtainable.

SUMMARY OF THE INVENTION

The present invention has been attained in view of the above-discussed circumstances.

Specifically, it is an object of the invention to provide a power steering device having a simple arrangement which employs a control valve for controlling the changeover of a flow path among a pump, a tank and opposite side chambers in accordance with movement of the steering wheel.

In accordance with the invention the control valve is arranged to connect the rod-side chamber to the pump and connect the tank to the head-side chamber when the piston is to be moved toward the head-side chamber, and simultaneously connect the pump to both the head-side chamber and the rod-side chamber when the piston is to be moved toward the rod-side chamber, whereby the movements of the piston in opposite directions are made equal. Accordingly, not only is a proper steering performance obtained, but also the valve arrangement is simple in construction and low in cost.

Further, the present invention provides a power steering apparatus which employs a control valve for controlling flow path changeover in which each of the rotor and the sleeve are provided with grooves formed at six circumferentially equidistantly spaced positions which are circumferentially phase-shifted between the rotor and the sleeve, and ports are formed in each of the rotor and the sleeve, whereby the rod-side and head-side chambers of the cylinder are connected to the pump and the tank respectively when the piston is to be moved toward the head-side chamber, and both the rod-side and head-side chambers are connected to the pump when the piston is to be moved toward the rod-side chamber.

DESCRIPTION OF THE PREFERRED EMBODIMENTS

Figure 1:
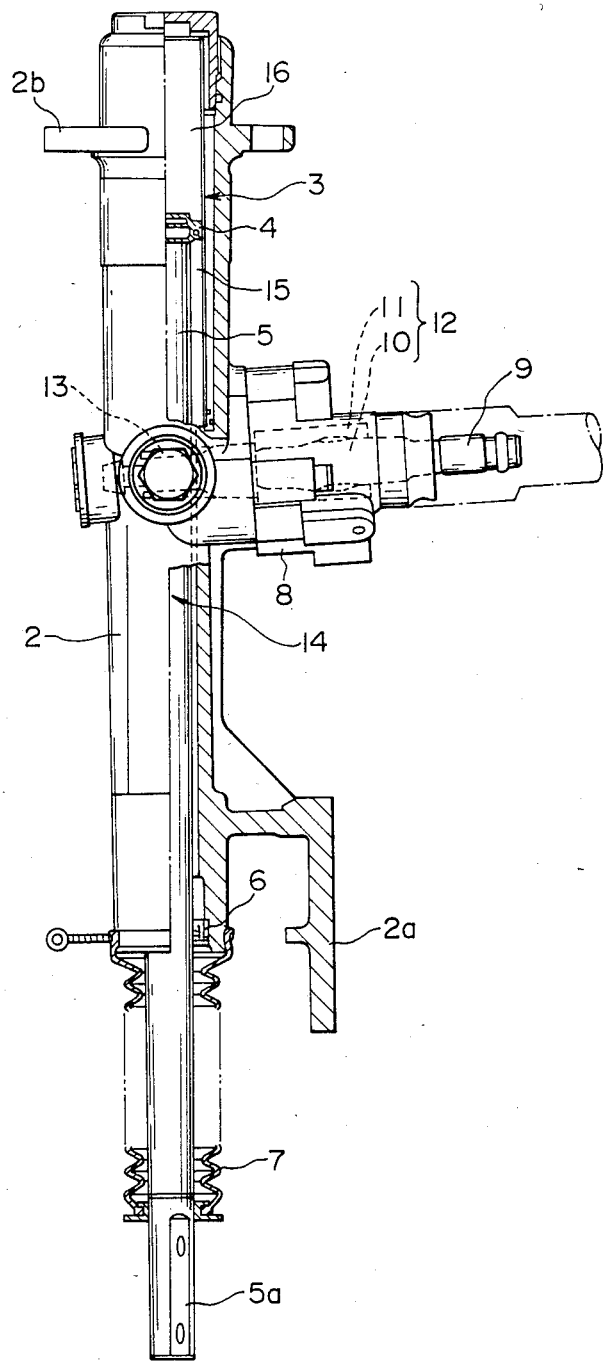
FIG. 1 is a side view, partially in cross section, of a power steering device of the invention.

The present invention will be described in detail with reference to preferred embodiments shown in the drawings.

FIG. 1 shows an embodiment of a power steering device to which the present invention is applied. In FIG. 1, the schematic construction of the main portion of the power steering device generally designated by reference numeral 1 will be briefly described first. Reference numeral 2 designates a steering body which has a substantially cylindrical shape and which is provided with an hydraulic fluid pressure cylinder portion 3 at one end thereof (at the right-hand end in the drawing). The steering body 2 is fixed to a car body (not shown) or the like through brackets 2a and 2b at the opposite ends thereof. A piston rod 5, slidably supported in the steering body, has at its inner end a piston 4 slidably movable in the cylinder portion 3. The outer end 5a of the piston rod 5 extends outward from its left end (in the drawing) and connects to a part of a steering link mechanism (not shown). In the drawing, reference numeral 6 designates an hydraulic fluid seal for holding the piston rod 5 at the left end of the steering body 2, and 7 designates a bellowslike protective cover which expands/contracts in accordance with the outward/inward movement of the piston rod 5.

A valve body 8 is provided extending substantially perpendicularly to the axial direction of the steering body 2 at substantially the axially central portion of the steering body. An input shaft 9, which rotates in interlocking engagement with a steering wheel (not shown), passes through the valve body 8 and is rotatably supported within the same. A rotary-type control valve 12 for changing an hydraulic fluid path to the hydraulic fluid pressure cylinder portion 3 is constituted, within the valve body 8, by a rotor 10 provided at the input shaft 9 side and a sleeve 11 disposed at the outer periphery of the rotor. The valve 12 is arranged such that a pinion 13 provided at the forward end of the input shaft 9 is engaged with a rack designated by reference numeral 14 in the drawing and formed on the piston rod 5 at its axially central portion. The structure of this component is substantially the same as that of a generally well-known rack and pinion type steering gear, and therefore a detailed description thereof is omitted.

According to the present invention, the power steering device 1 arranged in the manner described above is characterized in that the control valve 12 for selectively supplying pressurized hydraulic fluid from a pump (not shown) to the hydraulic fluid pressure cylinder portion 3 and left and right chambers 15 and 16 of the cylinder portion is arranged, in the manner shown in FIGS. 2A through 2C and 3A through 3C, so that the respective movements of the piston 4 and the piston rod 5 in the leftward and rightward directions are equal to each other, thus making the output characteristics the same in both directions.

In more detail, in the hydraulic fluid pressure cylinder portion 3, at the opposite sides of the piston 4, the area of the pressure receiving surface $S_1$ of the rod-side chamber 15 (designated by $C_1$ in FIG. 2A) is about one-half of the area of the pressure receiving surface $S_2$ of the other, head-side chamber 16 (designated by $C_2$ in the same drawing). For this purpose, it suffices to make the outer diameter $A_1$ of the piston rod 5 and the outer diameter $A_2$ of the cylinder 3 such that:

$$2A_1^2 \approx A_2^2.$$

Figure 2A:
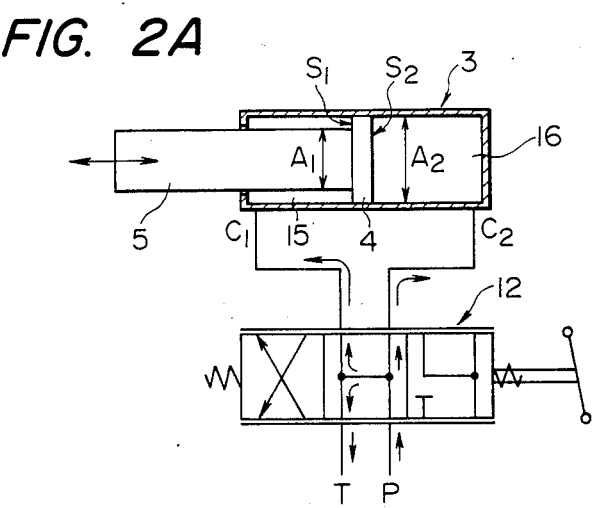
FIGS. 2A through 2C depict schematically the operation of a control valve of the invention in a neutral position, in a position for steering to the right, and for a position for steering to the left, respectively.
Figure 2B:
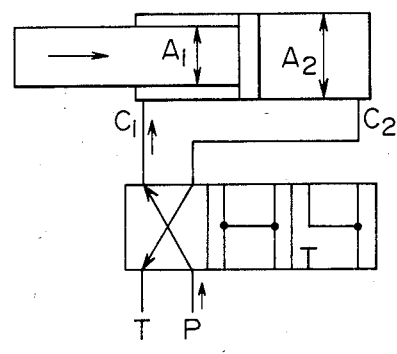
Figure 2C:
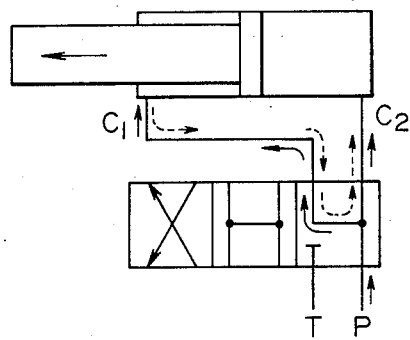

Thd piston 4 and cylinder 3 are shown in FIGS. 2A through 2C with a simplified functional representation of the control valve 12 to illustrate the general operaion sequence of the invention. The neutral position of the valve is shown in FIG. 2A where pressurized hydraulic fluid (designated by P in the drawings) from the pump is supplied to the rod-side chamber 15 ($C_1$) and the head-side chamber 16 of the cylinder 3. In the position for steering to the right, the piston 4 and the piston rod 5 are caused to move rightwardly as depicted in FIG. 2B by connecting the pressurized hydraulic fluid to the rod side chamber 15 ($C_1$), and by connecting the other, head-side chamber 16 ($C_2$) to the tank (designated by T in the drawings). On the other hand, when the pressurized hydraulic fluid is supplied to the head-side chamber 16 ($C_2$) to cause the piston 4, etc., to move leftwardly as shown in FIG. 2C, the pressurized hydraulic fluid from the pump P is supplied to the head-side chamber 16 ($C_2$), and at the same time the rod-side chamber 15 ($C_1$) is connected to the pump P.

Figure 3A:
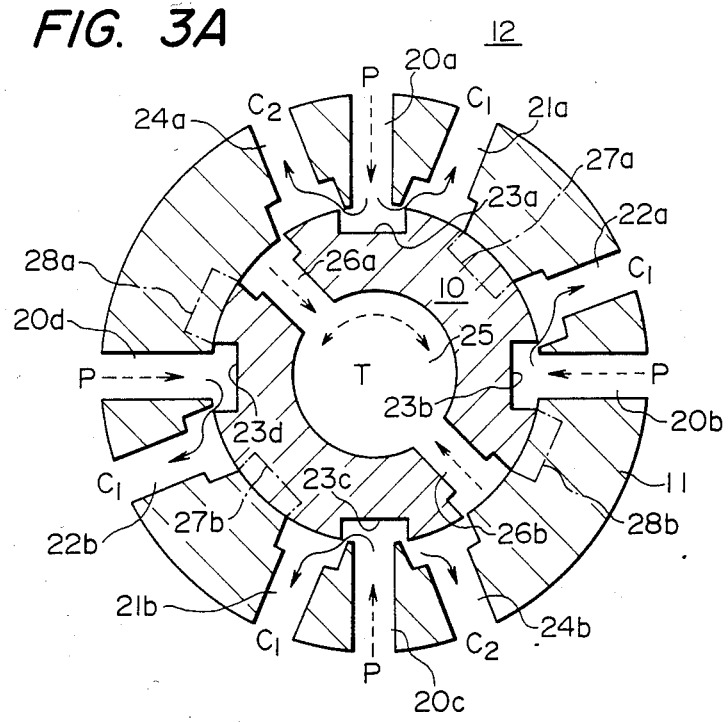
FIGS. 3A through 3C are cross-sectional views of a first embodiment of a control valve of the invention in a neutral position, in a position for steering to the right, and for steering to the left, respectively.
Figure 3B:
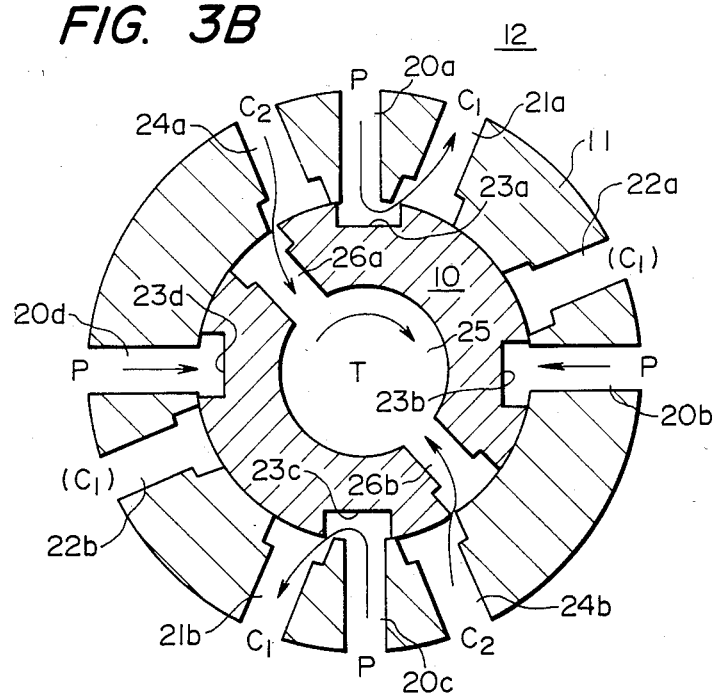
Figure 3C:
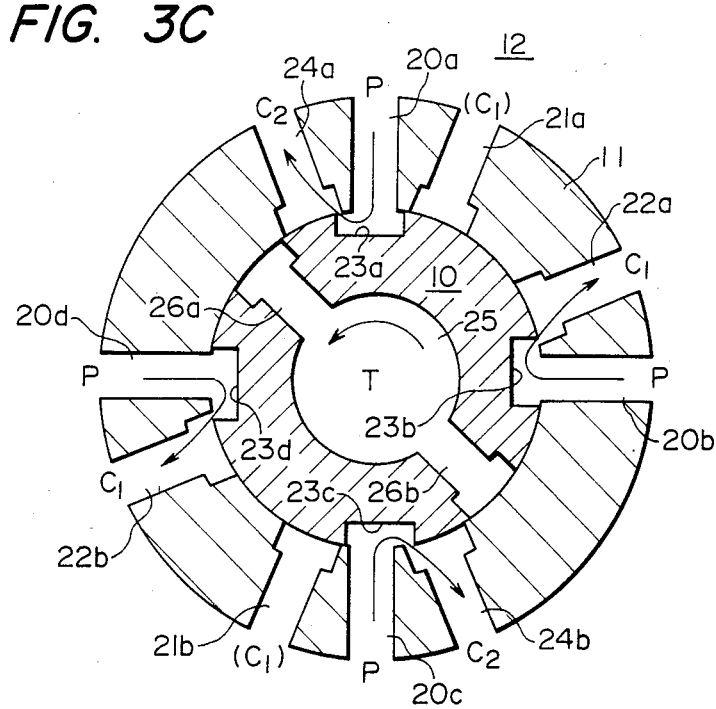

One embodiment of the control valve 12 for performing such fluid path changeover has a valve arrangement as shown schematically in FIGS. 3A through 3C. The positions of valve 12 in FIGS. 3A-3C correspond to the functional connections shown in FIGS. 2A-2C, respectively. That is, in the sleeve 11 constituting the control valve 12 inlet ports 20a, 20b, 20c and 20d, each connected to the pump P, are equidistantly disposed around the periphery of the sleeve 11. First hydraulic fluid supply ports 21a and 21b connected to the rod-side chamber 15 ($C_1$) of the cylinder are formed in opposition to each other at positions which are clockwise shifted by a slight phase from a pair of opposite ones 20a and 20c of the four inlet ports. First hydraulic fluid supply ports 22a and 22b, which are connected to the rod-side chamber 15 ($C_1$), are similarly formed counterclockwise shifted from the ports 20b and 20d. Equidistantly spaced grooves 23a, 23b, 23c and 23d are formed in the outer periphery of the rotor 10 at positions in opposition to respective ones of the ports 20a, 20b, 20c and 20d and are arranged such that either pair 20a, 20c and 20b, 20d of the suction ports can be connected to either pair 21a, 21b and 22a, 22b of the first hydraulic fluid supply ports to supply pressurized hydraulic fluid from the pump P to the rod-side chamber 15 ($C_1$).

Second hydraulic supply ports 24a and 24b, which are connected to the head-side chamber 16 ($C_2$), are formed on the respective counterclockwise sides of the inlet ports 20a and 20c, which have the first hydraulic fluid supply ports 21a and 21b, respectively, on their respective clockwise sides. Further, a return path 25 communicating with the tank T is formed at the central portion of the rotor 10. Hydraulic fluid discharge ports 26a and 26b extending from the return path 25 to the outer periphery of the rotor 10 are formed such that they open at respective positions counterclockwise shifted from the second hydraulic fluid supply ports 24a and 24b, respectively, in the neutral position shown in FIG. 3A.

When the rotor 10 and the sleeve 11 are in their neutral positions shown in FIG. 3A, the respective ports are connected with each other so that the pump P, the tank T and the cylinder side chambers $C_1$ and $C_2$ are communicated with each other.

In FIGS. 3A through 3C, reference numerals 27a, 27b, 28a and 28b designate grooves which are provided for facilitating the groove working at the outer periphery of the rotor 10 and the inner periphery of the sleeve 11 and which have no connection with the hydraulic fluid pressure path.

In the rotary-type control valve 12 constructed as described above, when the steering wheel is turned to the right (clockwise in the drawing), as shown in FIG. 3B, the inlet ports 20a and 20c connected to the pump P are separated from the second hydraulic fluid supply ports 24a and 24b due to the clockwise rotation of the rotor 10. At the same time, the second hydraulic fluid supply ports 24a and 24b are connected to the tank T through the hydraulic fluid discharge ports 26a and 26b, respectively, while the inlet ports 20a and 20c are connected to the pair 21a, 21b of the first hydraulic fluid supply ports through the respective grooves 23a and 23c of the rotor 10, whereupon pressurized hydraulic fluid is supplied only to the rod-side chamber 15 ($C_1$) so that the piston 4 is moved toward the head-side chamber 16 ($C_2$). At this time, the other pair 22a, 22b of the first hydraulic fluid supply ports are idled. When, as depicted in FIG. 3C, the steering wheel is turned to the left (counterclockwise in the drawing), the pair 21a and 21b of the first hydraulic fluid supply ports are separated from the inlet ports 20a and 20c, and hence from the pump P, due to the counterclockwise rotation of the rotor 10. At the same time, the second hydraulic fluid supply ports 24a and 24b are connected to the inlet ports 20a and 20c through the grooves 23a and 23c while, of course, separated from the tank T side hydraulic fluid discharge ports 26a and 26b. Accordingly, equal quantities of pressurized hydraulic fluid are applied to both cylinder-side chambers 15 and 16 ($C_1$, $C_2$) for the two different directions of turning of the steering wheel.

Using the thus-arranged control valve 12, in the single rod type cylinder 3 with opposite-side chambers 15 and 16 ($C_1$, $C_2$) having respective pressure receiving areas $S_1$ and $S_2$ which are different from each other as described above, it becomes possible to make the respective pressure-receiving areas for leftward and rightward steering operations substantially equal to each other to make the respective movements of the piston 4 equal in the opposite directions (for the same amount of steering wheel rotation) to thereby provide the same output characteristics for leftward and rightward directions of steering.

That is, the hydraulic fluid pressure acting area of the piston 4 for the rightward steering operation as shown in FIG. 3B is:

$$(\pi/4)(A_2^2 - A_1^2) \approx (\pi/4)A_1^2,$$

while for the leftward steering operation as shown in FIG. 3C it is also:

$$(\pi/4)(A_2^2 - A_1^2) \approx (\pi/4)A_1^2$$

because the pressurized hydraulic fluid is fed to both of the side chambers $C_1$ and $C_2$.

In such an arrangement, accordingly, it is possible to change the structure of the control valve 12 so as to supply pressurized hydraulic fluid only to the rodside chamber 15 ($C_1$) of the cylinder 3 when the rod-side chamber 15 ($C_1$) is supplied with hydraulic fluid pressure, while simultaneously supplying pressurized hydraulic fluid to both the side chambers 15 and 16 ($C_1$ and $C_2$) when the head-side chamber 16 ($C_2$) is supplied with hydraulic fluid pressure to thereby make the pressurized hydraulic fluid acting area of the piston 4 substantially the same for both directions of turning. Accordingly, the drawback of employing a single rod type cylinder can be completely eliminated in spite of the simple construction of the device. Further, according to the present invention, there is an advantage that it is possible to make the diameter of the piston rod 5 larger in comparison with the prior art by making the ratio of the respective pressure receiving areas of the cylinder side chambers 15 and 16 ($C_1$ and $C_2$) about 1:2, whereby not only can the piston rod 5 be improved in construction but the hydraulic fluid pressure output can be increased.

Figure 4A:
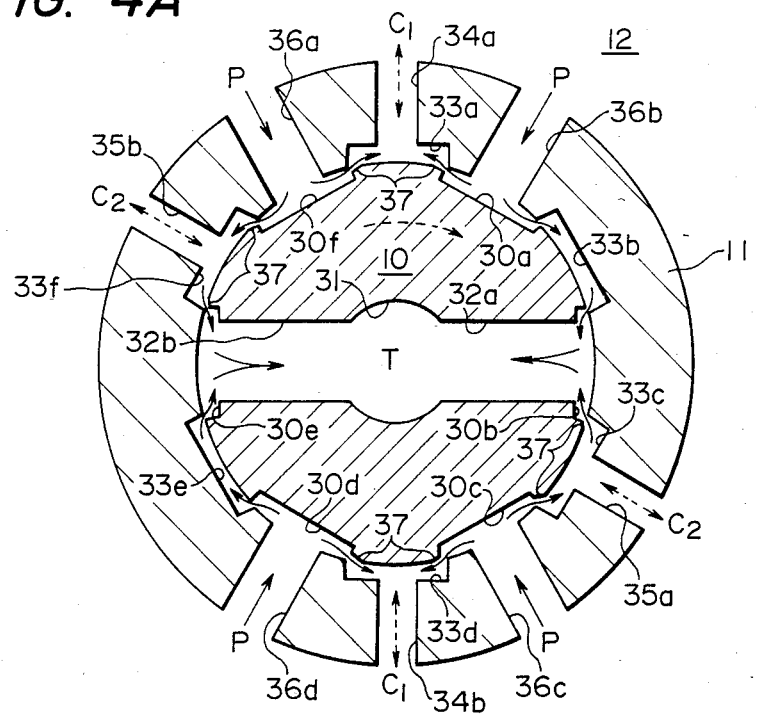
FIGS. 4A through 4C are cross-sectional views of a second embodiment of a control valve of the invention in a neutral position, in a position for steering to the right, and for steering to the left, respectively.
Figure 4B:
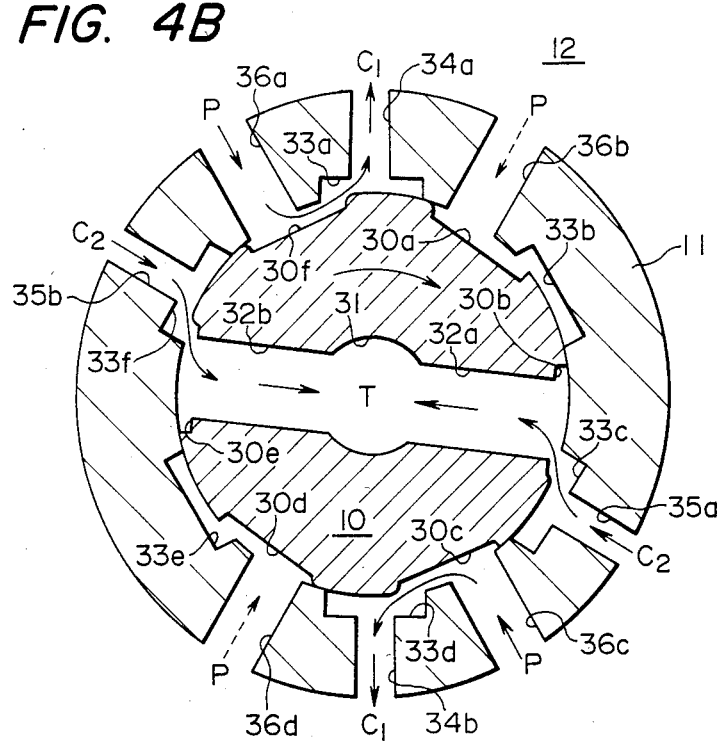
Figure 4C:
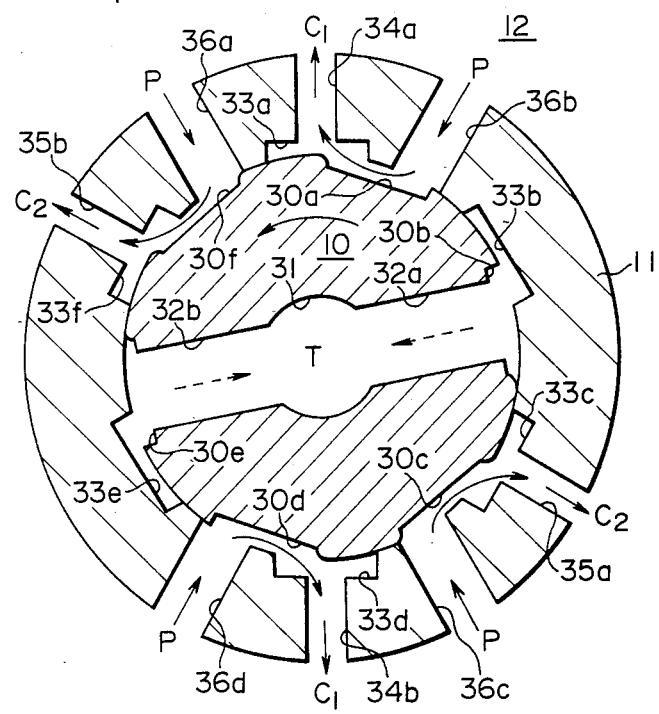

A second embodiment of the invention is depicted in FIGS. 4A through 4C. In this embodiment, grooves 30a, 30b, 30c, 30d, 30e and 30f are equidistantly formed in the circumferential direction at six positions spaced by a predetermined interval in the outer periphery of the rotor 10 constituting the control valve 12. A return path 31 connected to the tank T is formed in the axial direction at the central portion of the rotor. Hydraulic fluid discharge ports extending from the return path 31 to the outer periphery of the rotor open into a pair of grooves 30b and 30e on opposed sides of the return path 31.

In the inner periphery of the sleeve 11 accommodating the rotor 10 are formed equidistantly spaced grooves 33a, 33b, 33c, 33d, 33e and 33f at six respective positions circumferentially phase shifted from the grooves 30a to 30f of the rotor 10, with the grooves 33a to 33f being opposite respective land portions between the path grooves 30a to 30f of the rotor 10 in the neutral position depicted in FIG. 4A. A first pair 34a, 34b and a second pair 35a, 35b of hydraulic fluid supply ports, respectively connected to the rod-side chamber 15 ($C_1$) and the head-side chamber 16 ($C_2$), are formed in the outer periphery of the sleeve 11 opening into the two pairs of path grooves 33a, 33d and 33c, 33f of the path grooves 33a to 33f of the sleeve 11. Inlet ports 36a, 36b, 36c and 36d, all connected to the pump P, are formed in the outer periphery of the sleeve opening, in the neutral position, into respective ones of the grooves 33a and 33d into which the first hydraulic fluid supply ports 34a and 34b of the sleeve 11 open. Hence, pressurized hydraulic fluid can be fed into the flow path formed between the rotor 10 and the sleeve 11 through the grooves 30f, 30a, 30c and 30d of the rotor 10, which are positioned in opposition to the inlet ports 36a, 36b, 36c and 36d.

It is noted here that the pair of hydraulic fluid discharge ports 32a, 32b which communicate with the tank T and open into the pair of grooves 30a, 30e of the rotor 10 are positioned in opposition to the sleeve land portions between the path grooves 33c and 33f into which the second hydraulic fluid supply ports 35a and 35b of the sleeve 11 open and the grooves 33b and 33e adjacent the grooves 33c and 33f, and, in the position shown in FIG. 4C, are connected with no ports. The hydraulic fluid discharge ports 32a and 32b can be selectively connected to the second hydraulic fluid supply ports 35a and 35b by rotating the rotor 10 in the clockwise direction, as shown in FIG. 4B, to thereby cause the head-side chamber 16 ($C_2$) to be communicated with the tank T.

As will be apparent from FIG. 4A, the grooves 30a through 30f formed in the rotor 10 are wider than the grooves 33a through 33f formed in the sleeve 11. Accordingly, when rotor 10 and the sleeve 11 are in the neutral state shown in FIG. 4A, the above-mentioned ports are connected with each other through the gaps formed between the respective grooves so that the pump P, the tank T, the cylinder side chambers $C_1$ and $C_2$ are communicated with each other.

The opposite sides of each of the land portions formed between adjacent path grooves 30a through 30f of the rotor 10 are chamfered (indicated by 37 in the drawing) to prevent abrupt opening/closing of the flow path upon rotation of the rotor 10 relative to the sleeve 11. It is not, however, necessary to chamfer the land portions opposed to the grooves 33b and 33e which are not connected to any ports of the sleeve 11. That is, the pair of grooves 33b and 33e is provided only for the purpose of improving the formation of the sleeve 11 and to form the flow path for making smooth the state of continuous flow in the neutral state as depicted in FIG. 4A. Also, the pressure loss in the flow of pressurized hydraulic fluid can be reduced, as will be easily understood from the fact that each of the grooves 33b and 33e forms only a closed idle circuit during the flow path changeover operation when the rotor 10 is displaced in either direction.

In the rotary type control valve 12 constructed as described above, when the steering wheel is turned to the right (clockwise in the drawing) as shown in FIG. 4B, the inlet ports 36a and 36c connected to the pump P are separated form the second hydraulic fluid supply ports 35b and 35a due to the clockwise rotation of the rotor 10. At the same time, the second hydraulic fluid supply ports 35b and 35a are connected to the tank T through the hydraulic fluid discharge ports 32a and 32b, respectively, while the inlet ports 36a and 36c are connected to the first hydraulic fluid supply ports 34a and 34b through the grooves 30f and 30c, respectively, of the rotor 10 so that the pressurized hydraulic fluid is supplied only to the rod-side chamber 15 ($C_1$) so as to move the piston 4 toward the head-side chamber 16 ($C_2$).

When, as depicted in FIG. 4C, the steering wheel is turned to the left (counterclockwise in the drawing), the first hydraulic fluid supply ports 34a and 34b are separated from the inlet ports 36a and 36c, while the former are connected to the pump P through the ports 36b and 36d on the opposite side, due to the counterclockwise rotation of the rotor 10. At the same time, the second hydraulic fluid supply ports 35a and 35b are connected to the inlet ports 36a and 36c (which have been separated from the abovementioned first hydraulic fluid supply ports 34a and 34b) through the grooves 30f and 30c, while they are separated from the tank T side hydraulic fluid discharge ports 32a and 32b, so that the same quantity of pressurized hydraulic fluid is fed to both the cylinder side chambers 15 and 16 ($C_1$ and $C_2$).

Using the thus-arranged control valve 12 having the single rod type cylinder 3 with side chambers 15 and 16 ($C_1$ and $C_2$) respectively having pressure receiving areas $S_1$ and $S_2$ which are different from each other as described above, it becomes possible to make the respective pressure-receiving areas for leftward and rightward steering operations substantially equal to each other to make the respective movements of the piston 4 equal in the opposite directions (for the same amount of steering wheel rotation), to thereby provide the same output characteristics in the leftward and rightward directions of steering.

That is, as in the first-described embodiment, the hydraulic fluid pressure acting area of the piston 4 for the rightward steering operation as shown in FIG. 4B is:

$$(\pi/4)(A_2^2 - A_1^2) \simeq (\pi/4)A_1^2,$$

while for the leftward steering operation as shown in FIG. 4C;

$$(\pi/4)(A_2^2 - A_1^2) \simeq (\pi/4)A_1^2.$$

Further, in this second embodiment, the grooves 30a, through 30f and 33f through 33f of the rotor 10 and the sleeve 11, respectively, constituting the above-described hydraulic fluid pressure circuit are circumferentially equidistantly formed and the grooving can be easily performed to perform the machining of ports, chamfering, etc., upon the completion of the grooving, so that the machining operations can be easily performed, and hence the overall cost of the device is low.

The present invention is not restricted to the arrangement of the embodiment described above, and the shape, the arrangement of the parts thereof may of course be properly changed, modified, or altered, depending upon the requirements of the situation. The apparatus to which the present invention is applied, as well as the actuating fluid pressure, are not restricted to those illustrated in the described embodiment.

As described above, in the power steering apparatus according to the present invention, a control valve is employed which performs flow path changeover control such that the rod-side and head-side chambers of the cylinder are connected to the pump and the tank, respectively, when the piston is to be moved toward the head-side chamber, while both the rod-side and head-side chambers are connected to the pump when the piston is to be moved toward the rod-side chamber. This arrangement provides various remarkable advantages including the fact that the same output characteristics can be provided for both leftward and rightward directions of steering to thus provide a proper steering sense. It is also made possible to increase the diameter of the piston rod to thus improve the strength thereof so that the output can be increased.

Further, in the power steering apparatus according to the second embodiment, a control valve is provided for controlling flow path changeover in which both the rotor and the sleeve are provided with path grooves formed at six circumferentially equidistantly spaced positions which are circumferentially phase shifted between the rotor and the sleeve and ports are formed in each of the rotor and the sleeve, whereby the rod-side and head-side chambers of the cylinder are connected to the pump and the tank, respectively, when the piston is to be moved toward the head-side chamber, while both the rod-side and head-side chambers are connected to the pump when the piston is to be moved toward the rod-side chamber. The same advantages as in the first-described embodiment are obtained.

We claim:

1. In a power steering device provided with a fluid pressure cylinder of the single rod type in which a rod-side chamber and a head-side chamber of said cylinder have different pressure receiving areas on a piston slidably fitted in said cylinder, the improvement comprising: a control valve for controlling the changeover of a flow path among a pump, a tank and said chambers in accordance with movement of a steering wheel, said control valve comprising means for connecting said rod-side chamber to said pump and said tank to said head-side chamber when piston is to be moved toward said head-side chamber, and connecting said pump to both said head-side chamber and said rod-side chamber when said piston is to be moved toward said rod-side chamber;

wherein said control valve comprises a rotor and a sleeve, each of said rotor and said sleeve being provided with six grooves formed in an outer periphery of said rotor and in an inner periphery of said sleeve at equidistantly spaced positions, said sleeve having a first pair of supply ports connected to said rod-side chamber and opening into a first pair of opposed ones of said grooves formed in said sleeve, a second pair of supply ports connected to said head-side chamber and opening into a second pair of opposed ones of said grooves formed in said sleeve, and four hydraulic fluid inlet ports formed between respective ones of said supply ports and opening opposite respective grooves formed in said rotor, and said rotor having a longitudinally extending return path communicating with said tank and a pair of opposed hydraulic fluid discharge ports extending between said return path and a respective pair of said grooves formed in said rotor other than said grooves opposite said inlet ports.

2. The power steering device of claim 1, wherein land portions of said rotor between said grooves formed in said rotor disposed opposite said supply ports are chamfered.

3. The power steering device of any one of claims 1 or 2, wherein the pressure receiving area on the rod side of said piston is substantially one half the pressure receiving area on the head side of said piston.

* * * * *